Patented Apr. 16, 1935

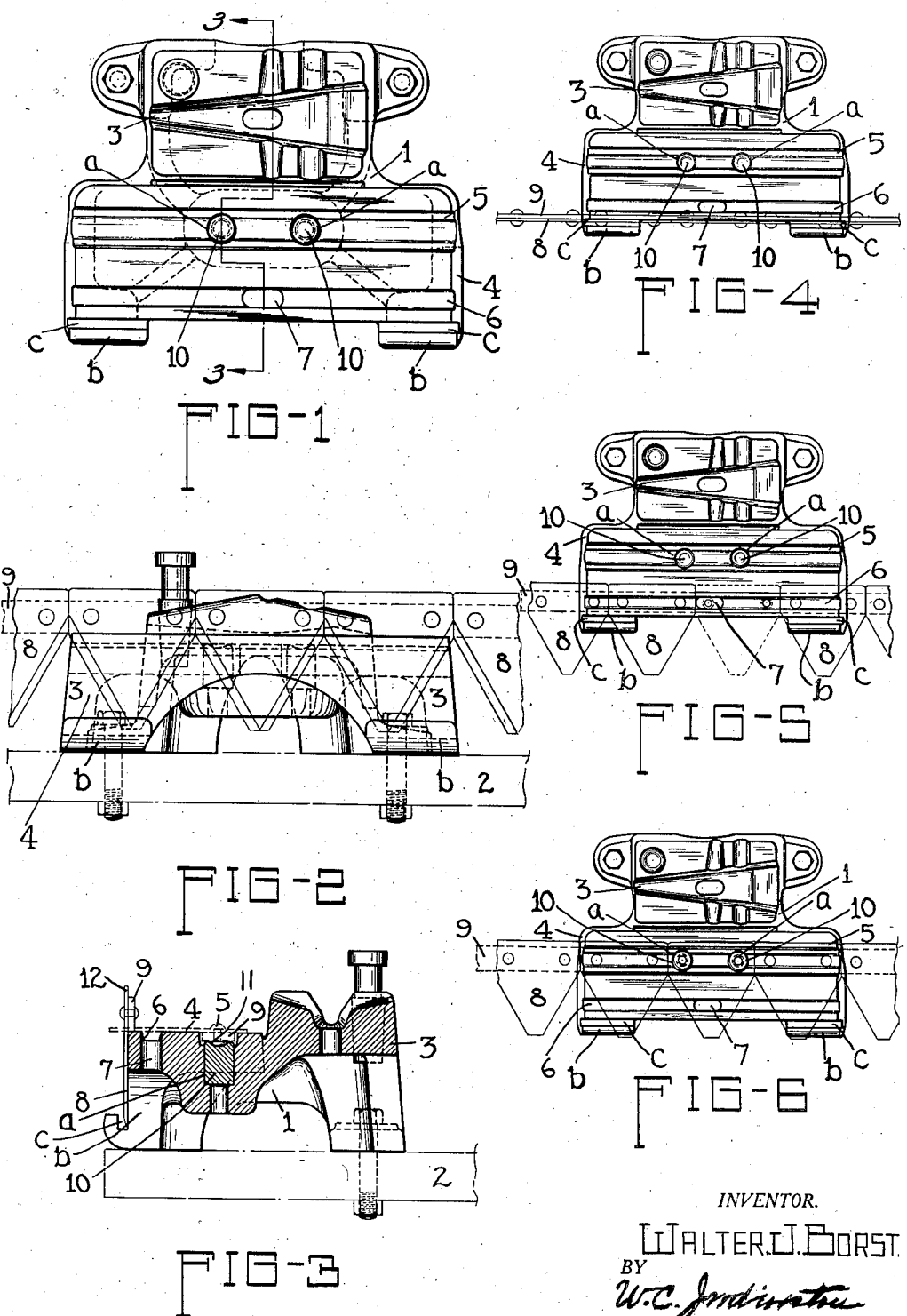

1,997,674

UNITED STATES PATENT OFFICE 1,997,674

ANVIL FOR HARVESTERS

Walter J. Borst, Moline, Ill., assignor to Deere & Company, Moline, Ill., a corporation of Illinois Application June 29, 1931, Serial No. 547,683

1 Claim. (Cl. 78—46)

My invention relates to anvils used especially in repairing knife bars of harvesting machinery, and has for its object to provide an anvil by the use of which the various rivets, by which the several parts of a knife bar and cutter bar are held together, can be readily removed and replaced.

Referring to the drawing in which similar numerals indicate identical parts:—

Figure 1 is a plan view of my improved anvil;

Figure 2 is a front elevation of Figure 1 showing in fine lines part of a knife bar in position for beheading the rivets of the sections resting on the anvil;

Figure 3 is a section on the line 3—3 of Figure 1 illustrating the position of a knife bar as in Figure 2.

Figure 4 is a reduced plan view of Figure 2;

Figure 5 is a reduced plan view showing in fine lines the position of a knife bar for the operation of removing a rivet; and, Figure 6 is a plan view showing in fine lines the position of a knife bar on the anvil when new rivets are to be inserted.

The anvil 1 is a solid metallic structure provided with bolt holes through which bolts are employed to secure it to a bench 2, or other suitable support, as illustrated in various figures in the drawing. The rear part 3 of the structure is to accommodate the placement of ledger plates on guard fingers or to remove them therefrom and is particularly described in the patent to Ronald Tolmie dated November 20, 1928, No. 1,692,004. This part is included in the structure to present in a single body means by which specific parts of the cutting devices of a harvester can be assembled or repaired. The forward part of the structure is particularly adapted for use in removing knife sections from a knife bar because of damage of such a nature as to impair the cutting efficiency.

The under part of the structure is cut away at the sides and front and rear thereof so that legs are formed to rest firmly on the bench 2. A groove 5 extends from side to side in the upper surface of the part 4 and is of sufficient width to accommodate a knife bar as shown in dotted lines in Figure 3. Adjacent the forward edge of the part 4 is a groove 6, parallel to the groove 5 and of lesser width, which has a central opening 7 extending through the part 4. On opposite sides of the transverse central line of the groove 5 are openings $a$ corresponding in distance apart to the distance between the rivets securing the sections 8 to the knife bar 9. In these openings $a$ are inserted anvil blocks 10 provided with concavities 11, as better shown in Figure 3, to receive rivet heads while riveting a section to the knife bar. The lower portions of the openings $a$ are reduced in diameter to provide ledges on which the blocks 10 rest. The front legs $b$ of the structure have transverse slots $c$ for a purpose hereinafter stated.

Presuming that it is necessary to remove one or more of the sections 8 from the knife bar 9, the bar is placed on the anvil, as shown in Figures 2, 3 and 4, with the bar resting on the upper forward surface of the anvil with the sections vertically disposed against the forward face of the anvil; with a suitable tool sharp blows on the end 12 of the section will remove the heads of the rivets securing the section to the knife bar, this operation being repeated according to the number of sections to be removed, the bar 9 being readily slidable on the surface of the anvil, and the sections movable in the slots $c$ of the legs $b$. It will be noted that when a section is being operated upon the adjacent sections are in the grooves $c$ and consequently the bar 9 and the sections thereon are prevented from tilting and are guided in a longitudinal movement of the bar.

After the heads of the desired number of rivets have been removed the bar 9 is placed flat upon the anvil so that a rivet registers with the opening 7, as shown in Figure 5, and by using a punch the rivet can be quickly displaced and falls through the opening 7 onto the bench or support 2, the remaining rivet heads resting in the groove 6 and movable therein as the bar 9 is passed along the anvil. In the operation of securing a section to the knife bar 9 the bar is moved bodily rearward on the anvil until it rests in the groove 5 with the sections resting on a flat portion of the upper surface of the anvil, as shown in Figure 6 and in dotted lines in Figure 3, the section to be secured thereon is loosely held on the bar by the rivets which have been inserted through the holes in the bar and the section, the heads of the rivets resting in the concavities in the anvil blocks 10. The exposed ends of the rivets are then upset by the use of a proper implement, after which the bar 9 and sections 8 thereon can be moved longitudinally on the anvil for further removal or replacement of sections.

The anvil has supplied a long felt want and is especially valuable for its completeness in that sections and ledger plates can be quickly and easily removed and replaced.

What I claim is—

An anvil, for use in repairing sickles comprising a knife bar and a plurality of knife sections riveted thereto, comprising a flat horizontal upper surface having a groove therein, said groove being wider than the width of the knife bar and deeper than the thickness of the knife bar, and an anvil block in the bottom of said groove, the top of said anvil block being spaced from said horizontal upper surface a distance substantially equal to the thickness of the knife bar, said anvil block having a depression therein, whereby the sickle may be rested upon the anvil with the knife bar in said groove and the knife sections bearing upon said horizontal upper surface and the head of a rivet may be received in the depression in said anvil block.

WALTER J. BORST.